J. W. REYNOLDS.
ARTIFICIAL BAIT.
APPLICATION FILED APR. 1, 1916.

1,200,135.

Patented Oct. 3, 1916.

INVENTOR
James W. Reynolds.
BY
George J. Ottsch
ATTORNEY

UNITED STATES PATENT OFFICE.

JAMES W. REYNOLDS, OF CHICAGO, ILLINOIS, ASSIGNOR TO SOUTH BEND BAIT COMPANY, OF SOUTH BEND, INDIANA, A CORPORATION OF INDIANA.

ARTIFICIAL BAIT.

1,200,135.      Specification of Letters Patent.      Patented Oct. 3, 1916.

Application filed April 1, 1916. Serial No. 88,359.

*To all whom it may concern:*

Be it known that I, JAMES W. REYNOLDS, a citizen of the United States, residing at Chicago in the county of Cook and State of Illinois, have invented certain new and useful Improvements in Artificial Baits, of which the following is a specification.

The invention relates to improvements in artificial baits or lures for fishing, and has for its primary object the provision of means whereby the bait can be adjusted so as to have any one of a variety of movements as same is drawn through the water, thus combining the particular actions of many other baits in one, and thereby obviating both the trouble and expense of carrying a variety of baits limited to a single action only.

A further object of the invention resides in the provision of a hook mounting normally underlying the body of the bait and carrying a plurality of hooks, and which mounting is adapted to be tripped automatically by the weight, resistance, or jerk of a fish caught on either of the hooks, and swing to a position in rear of the body and with a freedom of movement so that the remaining dangling hooks thereon will, owing to the struggle and swish of the fish to release itself, tend to again hook the fish, and by thus double hooking the fish in a large percentage of the strikes the number lost will be materially reduced. Mutilation and injury of the bait by the teeth and fins of the fish in its struggles to escape, is materially reduced by reason of the hook mounting swinging away from the body of the bait.

By the adjustment of the means employed to change the movement or action of the bait, the appearance of the bait is considerably changed, thus providing for both a variety of actions and form in a single bait.

The invention in the preferred form of details will be described in the following specification, reference being had particularly to the accompanying drawings, in which:—

Figure 1:
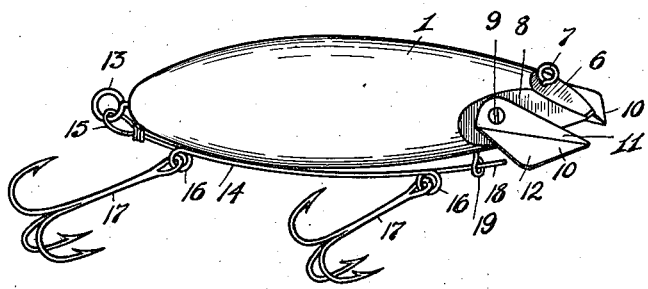
Figure 2:
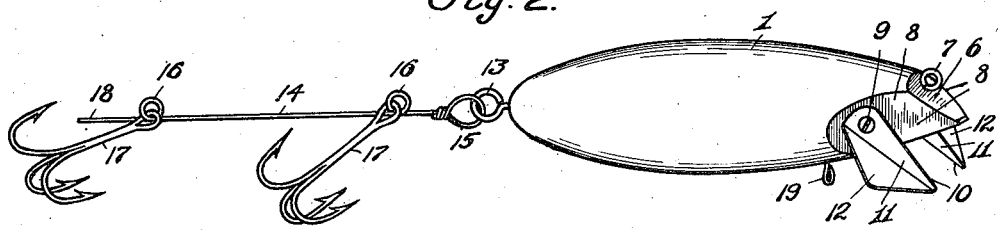

Figure 1 is a perspective view of a bait constructed in accordance with my invention. Fig. 2 is a similar view showing the hook holder in extended relation. Figs. 3, 4, 5 and 6 are fragmentary views showing the head end of the bait in perspective, and illustrating various adjustments of the fins.

Referring more particularly to the accompanying drawings, the bait comprises a body 1 having the general outline of the body of a minnow, and made of any suitable material, preferably wood, which will float in water, so that the bait will always rise to the surface when not drawn through the water by the angler. The forward end of the body is provided with a flat inclined surface 6, and a screw-eye 7 for the attachment of a fishline thereto. The head end of the bait is also provided with flat surfaces 8 on the opposing sides thereof, to which are attached, as by means of screws 9, angular fins 10. The screws 9 serve as a pivot for the fins, and by slightly retracting the screws the fins may be swung thereon and adjusted to any desired position, whereby a great variety of movements of the bait may be had as same is drawn through the water, as will be presently explained.

The fins 10 are identical in form and consist of angular related portions 11 and 12, the latter extending laterally with relation to the bait in any adjusted position of the fins, thereby serving as deflectors, and according to the position thereof, causing the bait to dive, to skip over the surface, to submerge and float near the surface, and to wabble or zig-zag in its movements as same is drawn through the water. By relatively varying the adjustment of the fins many different movements of the bait may be had, so that same will dive, wabble and pitch about in a life like manner. For example, with the fins adjusted as in Fig. 1, the bait is an underwater wiggler and has a zig-zag movement, the tail wiggle being identical with that of a live fish.

Figure 3:
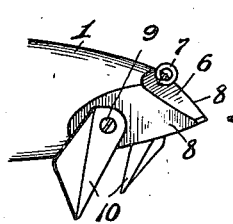
Figure 4:
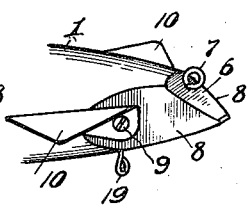
Figure 5:
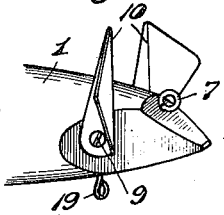
Figure 6:
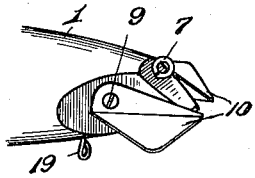

With the fins disposed as in Fig. 2, the tail end of the bait wiggles and bobs and darts on or near the surface. Fig. 3 shows the fins adjusted for a strictly surface bait, making a ripple and sound as it travels on the surface of the water. Fig. 4 shows the fins in position to throw a slight spray of water, and is used when the angler desires a surface bait with less action. With the fins as in Fig. 5, it is a surface bait that wabbles and splatters the water over the bait, making a great disturbance. Fig. 6 shows the fins in position to cause the bait to dive and pitch about in an erratic manner, the depth to which same dives being governed by the speed with which same is reeled in. Obviously the different adjustments of the fins likewise changes the appearance of the bait, so that many variations in both movement and appearance may be had to entice the fish to strike the bait, the mood for which varies with weather conditions, locality, depth of water, season of year, etc.

Attached to the tail end of the body, as by means of a screw-eye 13, is a hook mounting 14, preferably of flexible wire and looped at one end, as at 15, through said screw-eye, whereby the same may swing in any direction relatively of the body, and will trail behind the body when otherwise not connected thereto, as shown in Fig. 2. The mounting is provided with a number of loops 16 for attaching multiple hooks 17 thereto. When in normal position, the free end 18 of the mounting extends through an eyelet 19 depending from the body near the head end thereof, the placement thereof being accomplished by flexing the wire mounting to shorten the distance between the ends thereof, so that the free end may be passed through the eyelet. When in said normal position the mounting with its attached hooks underlies the body of the bait, and its free end is adapted to become automatically detached from its keeper by the weight or resistance of the hooked fish bending the mounting until it clears the keeper, whereby same will be free to swing to the rear of the body and have a freedom of movement which will have a tendency to cause the remaining dangling hooks, due to the swish and struggle of the fish to release itself, to again hook the fish, and by such double hooking materially reduce the percentage of fish ordinarily lost.

While the foregoing is the preferred form of my invention, I desire it to be understood that I do not limit myself to the precise structure shown and described, as it is obvious that the same may be variously modified without departing from the spirit of the invention.

Having thus described my invention, what I claim as new and desire to secure by Letters Patent is:—

1. An artificial bait comprising a body, a flexible hook-carrying mounting swingingly attached to the body, and a keeper on the body adapted to receive the free end of the mounting, said free end being releasable from the keeper by a flexing of the mounting.

2. An artificial bait comprising a body, a flexible hook-carrying mounting attached at one end to the body, and a keeper on the body adapted to receive the free end of the mounting, the mounting having a length greater than the distance between its attached end and the keeper and adapted to be withdrawn from the latter by a flexing of the mounting.

3. An artificial bait comprising a body, a flexible hook-carrying mounting swingingly attached to the tail end of the body, and a keeper carried by the body adapted to receive the free end of the mounting, said free end being released from its keeper by a flexing of the mounting.

4. An artificial bait comprising a body, a flexible hook-carrying mounting swingingly attached to the tail end of the body, an eyelet extending from the under side of the body and forwardly thereof adapted to receive the free end of the mounting, the length of the mounting being greater than the distance between the attached end thereof and said eyelet, whereby the mounting must be flexed in order to withdraw its free end from the eyelet.

In testimony whereof I affix my signature in presence of two witnesses.

JAMES W. REYNOLDS.

Witnesses:
ARTHUR P. RANKIN,
EUGENE L. RACE.